(12) United States Patent
Kanz et al.

(10) Patent No.: US 7,968,630 B2
(45) Date of Patent: Jun. 28, 2011

(54) PNEUMATIC TIRE CONTAINING ZINC PORPHYRIN COMPOUND

(75) Inventors: Carlo Kanz, Mamer (LU); Uwe Ernst Frank, Wendel (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 1618 days.

(21) Appl. No.: 11/222,362

(22) Filed: Sep. 8, 2005

(65) Prior Publication Data

US 2007/0054993 A1    Mar. 8, 2007

(51) Int. Cl.
*C08K 5/34* (2006.01)
*C08K 3/00* (2006.01)
*B60C 1/00* (2006.01)
*B60C 11/00* (2006.01)

(52) U.S. Cl. .............. 524/105; 524/571; 524/575.5; 152/209.5; 152/209.12

(58) Field of Classification Search .......... 152/209.5, 152/209.12; 524/105, 571, 575.5
See application file for complete search history.

(56) References Cited

U.S. PATENT DOCUMENTS

| | | | |
|---|---|---|---|
| 5,371,122 A * | 12/1994 | Kawahara et al. ........... 524/88 |
| 5,395,891 A | 3/1995 | Obrecht et al. ........... 525/194 |
| 5,504,135 A | 4/1996 | Ardrizzi et al. ........... 524/484 |
| 5,672,639 A | 9/1997 | Corvasce et al. ........... 524/52 |
| 5,847,034 A * | 12/1998 | Achenbach et al. ........... 524/91 |
| 6,103,808 A | 8/2000 | Hashimoto ........... 524/484 |
| 6,127,488 A | 10/2000 | Obrecht et al. ........... 525/333.3 |
| 6,133,364 A | 10/2000 | Obrecht et al. ........... 524/495 |
| 6,146,520 A | 11/2000 | Gupte et al. ........... 208/322 |
| 6,207,757 B1 | 3/2001 | Obrecht et al. ........... 525/194 |
| 6,242,534 B1 | 6/2001 | Obrecht et al. ........... 525/191 |
| 6,248,929 B1 | 6/2001 | Kaimai et al. ........... 585/241 |
| 6,337,361 B1 * | 1/2002 | Yatsuyanagi et al. ........ 523/209 |
| 6,372,857 B1 | 4/2002 | Obrecht et al. ........... 525/332.6 |
| 6,399,697 B1 | 6/2002 | Takasaki et al. ........... 524/575 |
| 6,410,816 B2 | 6/2002 | Takasaki et al. ........... 585/833 |
| 6,420,553 B1 | 7/2002 | Inoue et al. ........... 540/145 |
| 6,699,924 B1 | 3/2004 | Daude ........... 524/431 |
| 2001/0007049 A1 | 7/2001 | Takasaki et al. ........... 585/833 |
| 2001/0023307 A1 | 9/2001 | Kaimai et al. ........... 585/241 |
| 2002/0000280 A1 | 1/2002 | Scholl ........... 152/519 |
| 2002/0045697 A1 | 4/2002 | Sohnen et al. ........... 524/492 |
| 2002/0144761 A1 * | 10/2002 | Zanzig et al. ........... 152/209.5 |
| 2002/0174924 A1 | 11/2002 | Zanzig et al. ........... 152/210 |

FOREIGN PATENT DOCUMENTS

| | | |
|---|---|---|
| EP | 0 839 891 | 5/1998 |
| ES | 2122917 | 12/1998 |
| JP | 19800051653 | 4/1980 |
| JP | 19930059267 | 2/1993 |
| JP | 20000197300 | 5/2000 |
| JP | 2002097369 | 4/2002 |

* cited by examiner

*Primary Examiner* — William K Cheung
(74) *Attorney, Agent, or Firm* — John D. DeLong

(57) ABSTRACT

The present invention is directed to a pneumatic tire having at least one component including a sulfur vulcanizable rubber composition, the rubber composition including at least one diene based rubber and at least one zinc porphyrin compound.

18 Claims, No Drawings

PNEUMATIC TIRE CONTAINING ZINC PORPHYRIN COMPOUND

BACKGROUND OF THE INVENTION

Rubber compounds used in pneumatic tire conventionally utilize a sulfur-based curing system incorporating several curatives, such as elemental sulfur or sulfur donors, accelerators, stearic acid, and zinc oxide. Recently it has become desirable to reduce the amount of zinc in the tire rubber. It would therefore be desirable to have a rubber compound and pneumatic tire cured using a cure system with the potential for a reduced zinc content in the rubber composition.

SUMMARY OF THE INVENTION

The present invention is directed to a pneumatic tire having at least one component comprising a sulfur vulcanizable rubber composition, the rubber composition comprising at least one diene based rubber and a zinc porphyrin.

DETAILED DESCRIPTION OF THE INVENTION

There is disclosed a pneumatic tire having at least one component comprising a sulfur vulcanizable rubber composition, the rubber composition comprising at least one diene based rubber and a zinc porphyrin.

The pneumatic tire of the present invention contains at least one zinc porphyrin compound of formula I.

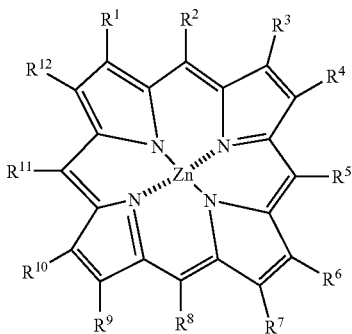

I wherein $R^1$ through $R^{12}$ is each independently selected from the group consisting of hydrogen, alkyl groups, alkoxy groups, amino groups, cyano groups, phenyl groups, benzo groups, and pyridyl groups.

Suitable zinc porphyrin compounds are known for example from U.S. Pat. No. 5,371,122 and may be produced by a method as described in U.S. Pat. No. 6,420,553. Several zinc porphyrin compounds of formula I are available commercially, for example, from Sigma-Aldrich.

In one embodiment, the rubber composition contains from about 1 to about 15 phr of the zinc porphyrin compound. In another embodiment, the rubber composition contains from about 1 to about 10 phr of the zinc porphyrin compound. In another embodiment, the rubber composition comprises from about 1 to about 5 phr of the zinc porphyrin compound.

The zinc porphyrin may be used as a replacement for or in combination with zinc oxide in the rubber composition. In either case, it has now been found that through the use of zinc porphyrin, the total amount of zinc in the rubber composition may be less than 1.5 phr as zinc metal. In another embodiment, the total amount of zinc in the rubber composition may be less than 1 phr as zinc metal. In another embodiment, the total amount of zinc in the rubber composition may be less than 0.5 phr as zinc metal. In another embodiment, the total amount of zinc in the rubber composition may be less than 0.25 phr as zinc metal.

The present invention may be used with rubbers or elastomers containing olefinic unsaturation. The phrases "rubber or elastomer containing olefinic unsaturation" or "diene based rubbers" are intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The rubber composition may optionally include from 0 to about 20 phr of 3,4-polyisoprene rubber. The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, napthenic, vegetable oils, and low PCA oils, such as MES, TDAE, SRAE and heavy naphthenic oils.

In one embodiment, the rubber composition includes a low PCA oil. Suitable low PCA oils include but are not limited to mild extraction solvates (MES), treated distillate aromatic extracts (TDAE), and heavy napthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy napthenic oils generally have a Tg in a range of from about −42° C. to about −48° C.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

In one embodiment, the low PCA oils may be an MES, TDAE or heavy napthenic types having characteristics as identified in the following table.

| Properties | MES | TDAE | Heavy Naphthenic |
|---|---|---|---|
| Aromatics % (2140) | 11-17 | 25-30 | 11-17 |
| Spec. Gravity @ 15° C. (kg/l) | 0.895-0.925 | 0.930-0.960 | 0.920-0.950 |
| Visc. 40° C. (cSt) | 150-230 | 370-430 | 350-820 |
| Visc. 100° C. (cSt) | 13-17 | 16-22 | 17-33 |
| Visc. Gravity Const. | 0.825-0.865 | 0.860-0.890 | 0.840-0.870 |
| Refractive Index | 1.495-1.510 | 1.520-1.540 | 1.500-1.520 |
| Tg (° C.)/inflection | −60 ± 3 | −47 ± 3 | −45 ± 3 |
| Aniline Point (° C.) | 85-100 | | |
| Pour Point (° C.) | 0 max | 30 max | 0 max |
| DMSO (%, IP 346) | <2.9 | <2.9 | <2.9 |
| Flashpoint (° C.) | >220 | >240 | >240 |

In one embodiment, the low PCA oils may be an MES type that is a complex combination of hydrocarbons predominantly comprised of saturated hydrocarbons in the range of $C_{20}$ to $C_{50}$ obtained by (1) solvent extraction of heavy petroleum distillate; or (2) treating of heavy petroleum distillate with hydrogen in the presence of a catalyst; followed by solvent dewaxing. In one embodiment, the low PCA oil contains not more than 1 mg/kg of benzo(a)pyrene, and not more than 10 mg/kg total of the following polycyclic aromatic hydrocarbons: benzo(a)pyrene, benzo(e)pyrene, benzo(a)anthracene, benzo(b)fluoranthene, benzo(j)fluoranthene, benzo (k)fluoranthene, dibenzo(a,h)anthracene, and chrysene.

Suitable MES oils are available commercially as Catenex SNR from Shell, Prorex 15 and Flexon 683 from ExxonMobil, VivaTec 200 from BP, Plaxolene MS from TotalFinaElf, Tudalen 4160/4225 from Dahleke, MES-H from Repsol, MES from Z8, and Olio MES S201 from Agip. Suitable TDAE oils are available as Tyrex 20 from ExxonMobil, VivaTec 500, VivaTec 180 and Enerthene 1849 from BP, and Extensoil 1996 from Repsol. Suitable heavy naphthenic oils are available as Shellflex 794, Ergon Black Oil C1, Ergon Black Oil C2, Ergon H2000, Cross C2000, Cross C2400, and San Joaquin 2000L. Suitable SRAE oil includes NC 140 from Japan Energy Corp. The oils may be available as the oil alone or along with an elastomer in the form of an extended elastomer.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 10 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from 1 to 150 phr of carbon black.

Commonly employed carbon blacks can be used as a conventional filler. Representative examples of such carbon blacks include N110, N121, N134, N220, N231, N234, N242, N293, N299, N315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

Z-Alk-S$_n$-Alk-Z  II in which Z is selected from the group consisting of

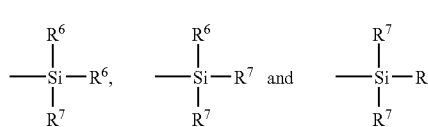

where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

In one embodiment, the sulfur containing organosilicon compounds are the 3,3'-bis(trimethoxy or triethoxy silylpropyl) sulfides. In one embodiment, the sulfur containing organosilicon compounds are 3,3'-bis(triethoxysilylpropyl) disulfide and 3,3'-bis(triethoxysilylpropyl) tetrasulfide. Therefore, as to formula II, Z may be

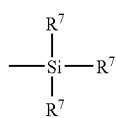

where R$^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C($=\!=$O)—S—CH$_2$CH$_2$CH$_2$SiX$_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, CH$_3$(CH$_2$)$_6$C($=\!=$O)—S—CH$_2$CH$_2$CH$_2$Si(OCH$_2$CH$_3$)$_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas III or IV

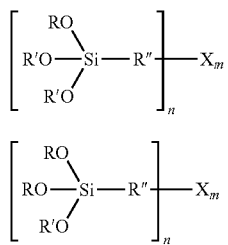

wherein: R is a methyl or ethyl group;

R' is identical or different and is a C$_9$C$_{30}$ branched or unbranched monovalent alkyl or alkenyl group, aryl group, aralkyl group, branched or unbranched C$_2$-C$_{30}$ alkyl ether group, branched or unbranched C$_2$-C$_{30}$ alkyl polyether group or R'''$_3$Si, where R''' is C$_1$-C$_{30}$ branched or unbranched alkyl or alkenyl group, aralkyl group or aryl group, R'' is a branched or unbranched, saturated or unsaturated, aliphatic, aromatic or mixed aliphatic/aromatic divalent C$_1$-C$_{30}$ hydrocarbon group;

X is SH where n=1 and m=1, S where n=2 and m=1-10 and mixtures thereof, S(C$=\!=$O)—R''' where n=1 and m=1 or H where n=1 and m=1;

R'' may mean CH$_2$, CH$_2$CH$_2$, CH$_2$CH$_2$CH$_2$, CH$_2$CH$_2$CH$_2$CH$_2$, CH(CH$_3$), CH$_2$CH(CH$_3$), C(CH$_3$)$_2$, CH(C$_2$H$_5$), CH$_2$CH$_2$CH(CH$_3$), CH$_2$CH(CH$_3$)CH$_2$ or

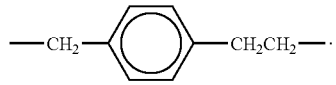

In one embodiment, the sulfur containing organosilicon compound is of formula III, R is ethyl, R' is C$_{12}$-C$_{14}$ alkyl, R'' is CH$_2$CH$_2$CH$_2$, X is SH, n is 1 and m is 1. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr; however, to reduce the amount of total zinc in the compound lesser amounts or none may be used. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Partial or complete replacement of zinc oxide with the zinc porphyrin compound is contemplated to result in a rubber compound having similar physical properties as compared with a control. It is comtemplated that the total amount of zinc metal in such a compound would be much lower than in a control, owing to the greater molecular weight of the zinc porphyrin.

The invention is further illustrated by the following non-limiting examples

EXAMPLE 1

In this example, the effect of replacing zinc oxide with a substituted zinc porphyrin compound in a sulfur cured rubber compound is illustrated. Two rubber compounds were mixed in a two step mixing process, following the recipes shown in Table 1 with all amounts in phr. The rubber compounds were cured and tested using the following procedures:

| | |
|---|---|
| Zwick Rebound | ASTM D1054, DIN 53512 |
| RPA 2000 | ASTM D5289 |
| MV2000 Plasticity | ASTM D1646, DIN 53523 |
| Drum Abrasion | ASTM D5963, DIN 53516 |
| MDR 2000 | ASTM D2084, D5289 |

Results of the physical properties testing is shown in Table 2.

TABLE 1

| Sample | control 1 | invention 2 |
|---|---|---|
| Non-Productive Mix Stage | | |
| SBR[1] | 80 | 80 |
| Polybutadiene[2] | 20 | 20 |
| Silica[3] | 80 | 80 |
| Coupling Agent[4] | 10 | 10 |
| Fatty Acid | 3 | 3 |
| Productive Mix Stage | | |
| Accelerators[5] | 2 | 2 |
| Antioxidant[6] | 2 | 2 |
| Sulfur | 2 | 2 |
| Zinc Oxide | 2.5 | 1.25 |
| Zinc porphyrin compound[7] | 0 | 0.6 |

[1]Solution styrene butadiene rubber as T0596 by JSR
[2]Cis 1,4 polybutadiene rubber as BUDENE 1207 by The Goodyear Tire & Rubber Company
[3]Silica as Zeosil 1165 MP from the Rhone Poulenc Company
[4]Blend of bis (3 triethoxy-siliylpropyl) tetrasulfide and carbon black in a 1:1 ratio as X50S from Degussa GmbH
[5]Sulfenamide and thiuram type
[6]Of dihydrotrimethyl quinoline type
[7]5,10,15,20-tetraphenyl-21H, 23H porphine zinc salt by Sigma-Aldrich As seen in Table 2, replacement of 1.25 phr of zinc oxide with 0.6 phr of the substituted zinc porphyrin compound resulted in a rubber compound having similar physical properties as compared with the control. Significantly, the total amount of zinc metal in sample 2 is much lower than in sample 1, owing to the greater molecular weight of the 5,10, 15,20-tetraphenyl-21H, 23H porphine zinc (678.1 vs. 81.4 for zinc oxide). The total zinc in sample 2 was therefore about 1.06 phr (as zinc metal), while that for sample 1 was about 2 phr (as zinc metal). Through use of the zinc porphyrin compound, then, a satisfactory cured rubber compound is obtained with a much lower zinc content than for the compound with zinc oxide. Surprisingly and unexpectedly, the zinc content of the rubber compound was reduced by a factor of approximately 2 without reduction in physical properties of the cured rubber.

TABLE 2

| Physical Properties | Sample 1 | Sample 2 |
|---|---|---|
| Cured 14 minutes at 160° C. | | |
| Zwick rebound (100° C.) (%) | 67 | 65 |
| Zwick rebound 14/160 (0° C.) (%) | 16 | 16 |
| RPA 2000 (100° C.) | | |
| G' (15%) green (MPa) | 0.257 | 0.256 |
| G' (1%) (MPa) | 2.927 | 2.694 |
| G' (15%) (MPa) | 1.835 | 1.732 |
| G' (50%) (MPa) | 1.197 | 1.154 |
| G' (10%) (MPa) | 0.224 | 0.197 |
| Tan delta (10%) | 0.109 | 0.104 |
| MV2000 Plasticity, Final viscosity (Mooney) | 57 | 57 |
| Insoluble Polymer by GPC (%) | 46 | 52 |
| MV2000 Scorch (121° C.) | | |
| T +5 (Min) | 37 | 33 |
| T +20 (Min) | 45 | 37 |
| MDR2000 Light Tire (160° C.) | | |
| Minimum S' (dN-m) | 3.2 | 3.3 |
| Maximum S' (dN-m) | 22.8 | 21.4 |
| Amount S' (dN-m) | 19.6 | 18.1 |
| T25 (min) | 3.7 | 3.1 |
| T90 (min) | 6.9 | 5.4 |
| Rotary Drum Abrasion | | |
| Loss specimens (mm³) | 71 | 65 |
| Loss standards (mg) | 198 | 192 |
| Relative volume loss (mm³) | 60 | 57 |

TABLE 2-continued

| Physical Properties | Sample 1 | Sample 2 |
|---|---|---|
| Tensile Properties (23° C.) | | |
| Elongation at break (%) | 424 | 445 |
| 100% modulus (MPa) | 2.5 | 2.3 |
| 200% modulus (MPa) | 6.5 | 6.1 |
| 300% modulus (MPa) | 11.9 | 11.8 |
| Rebound at 23° C. (%) | 37 | 36 |
| Shore A | 66 | 66 |
| Specific gravity (g/cm$^3$) | 1.192 | 1.191 |
| Tensile strength (MPa) | 16.6 | 17.8 |

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having at least one component comprising a sulfur vulcanizable rubber composition, the rubber composition comprising: at least one diene based rubber selected from the group consisting of natural rubber, synthetic polyisoprene, polybutadiene, and styrene-butadiene rubber; carbon black, and zinc porphyrin; wherein the total zinc content of the rubber composition is less than 1.5 phr as zinc metal.

2. The pneumatic tire of claim 1, wherein the total zinc content of the rubber composition is less than 1 phr as zinc metal.

3. The pneumatic tire of claim 1, wherein the total zinc content of the rubber composition is less than 0.5 phr as zinc metal.

4. A pneumatic tire having at least one component comprising a sulfur vulcanizable rubber composition, the rubber composition comprising at least one diene based rubber selected from the group consisting of natural rubber, synthetic polyisoprene, polybutadiene, and styrene-butadiene rubber; carbon black, and at least one zinc porphyrin compound of formula I

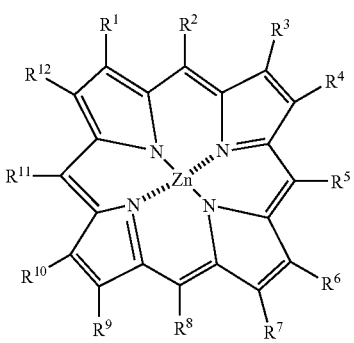

I wherein $R^1$ through $R^{12}$ is each independently selected from the group consisting of hydrogen, alkyl groups, alkoxy groups, amino groups, cyano groups, phenyl groups, benzo groups, and pyridyl groups.

5. The pneumatic tire of claim 4, wherein each of $R^1$-$R^{12}$ are hydrogen, and the at least one zinc porphyrin compound of formula I comprises zinc porphyrin.

6. The pneumatic tire of claim 4 wherein said zinc porphyrin compound is present in an amount ranging from 1 to 15 phr.

7. The pneumatic tire of claim 4 wherein said zinc porphyrin compound is present in an amount ranging from 1 to 10 phr.

8. The pneumatic tire of claim 4 wherein said zinc porphyrin compound is present in an amount ranging from 1 to 5 phr.

9. The pneumatic tire of claim 4 wherein the total zinc content of the rubber composition is less than 1.5 phr as zinc metal.

10. The pneumatic tire of claim 4 wherein the total zinc content of the rubber composition is less than 1 phr as zinc metal.

11. The pneumatic tire of claim 4 wherein the total zinc content of the rubber composition is less than 0.5 phr as zinc metal.

12. The pneumatic tire of claim 4 wherein the total zinc content of the rubber composition is less than 0.25 phr as zinc metal.

13. The pneumatic tire of claim 4 wherein said sulfur vulcanizable rubber composition further comprises from about 0.5 to about 8 phr of sulfur.

14. The pneumatic tire of claim 4 wherein said sulfur vulcanizable rubber composition further comprises from 0.4 to 5 phr of at least one accelerator selected from the group consisting of amines, disulfides, guanidines, thioureas, thiazoles, thiurams, sulfenamides, dithiocarbamates and xanthates.

15. The pneumatic tire of claim 4 wherein the rubber component is selected from the group consisting of tread cap, tread base, sidewall, apex, chafer, sidewall insert, wirecoat or innerliner.

16. The pneumatic tire of claim 4 wherein said sulfur vulcanizable rubber composition further comprises from about 10 to about 150 phr of carbon black.

17. The pneumatic tire of claim 4 wherein the rubber composition further comprises from about 10 to about 150 phr of silica.

18. The pneumatic tire of claim 17, wherein the rubber composition further comprises a sulfur containing organosilicon compound.

* * * * *